March 28, 1939.　　　　J. H. KNAPP　　　　2,151,854
LIQUID HEATER AND VAPORIZER
Filed Dec. 30, 1937　　　3 Sheets-Sheet 1
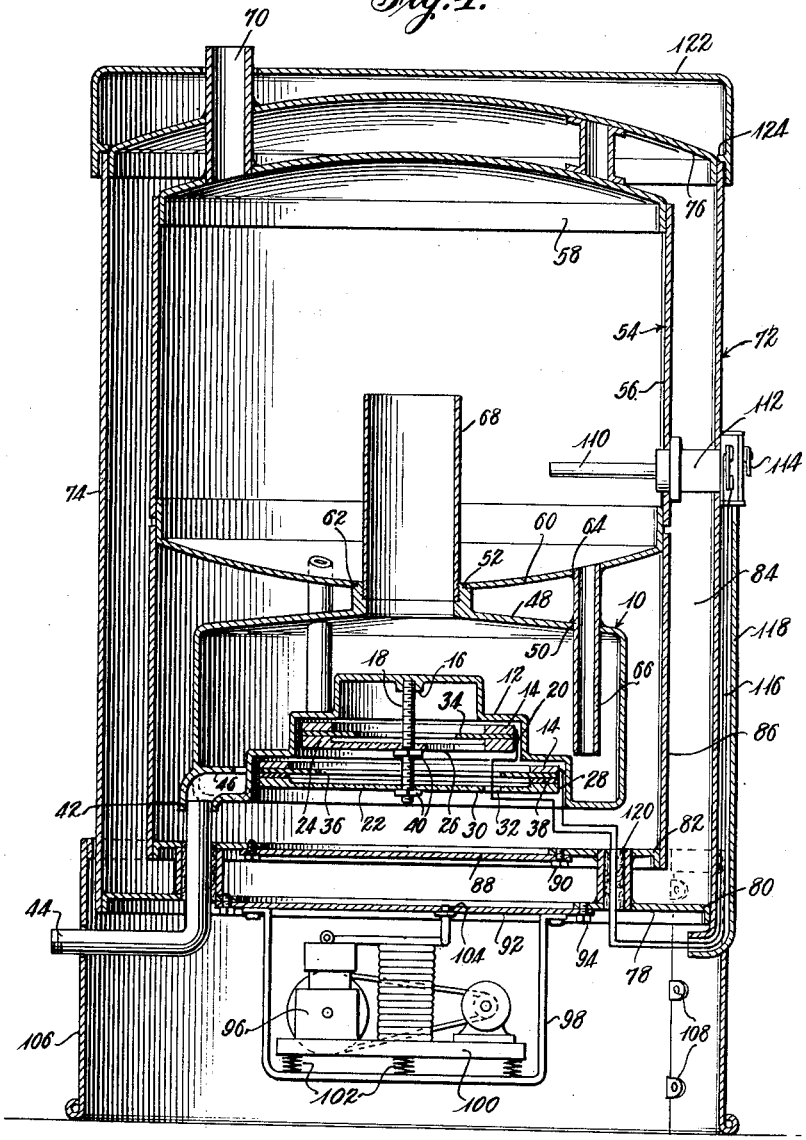
Inventor
Joseph H. Knapp
Attorney March 28, 1939.  J. H. KNAPP  2,151,854
LIQUID HEATER AND VAPORIZER
Filed Dec. 30, 1937  3 Sheets-Sheet 2
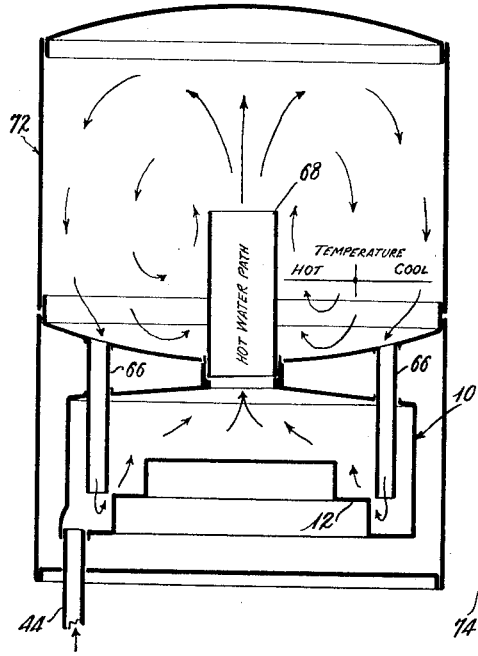
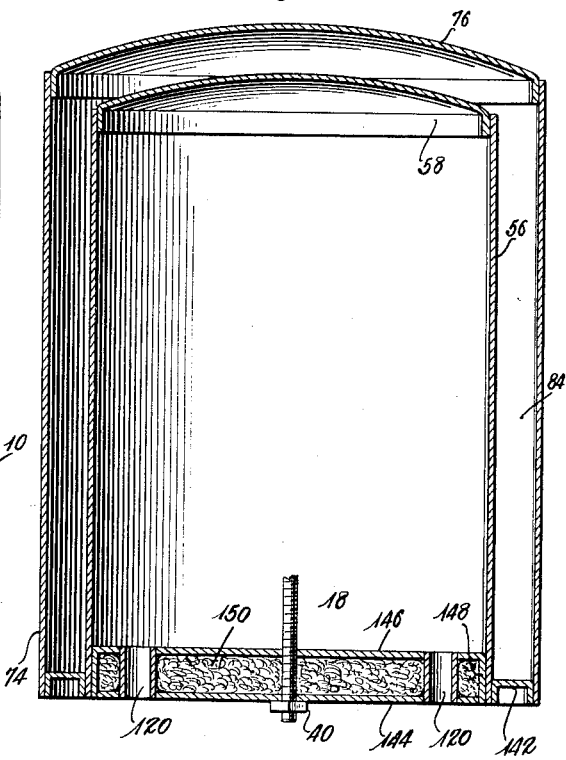
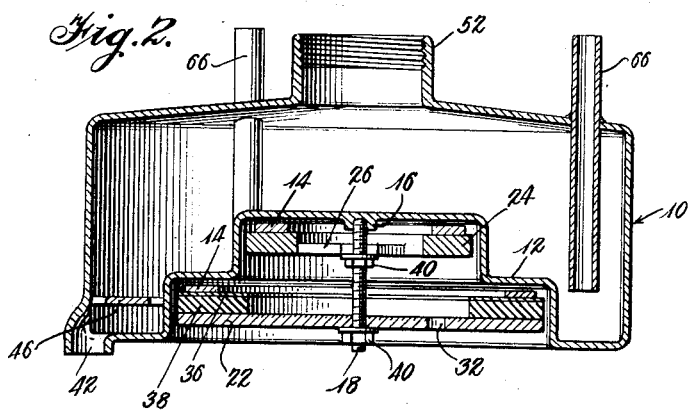
Inventor
Joseph H. Knapp
By
Attorney March 28, 1939. J. H. KNAPP 2,151,854
LIQUID HEATER AND VAPORIZER
Filed Dec. 30, 1937 3 Sheets-Sheet 3
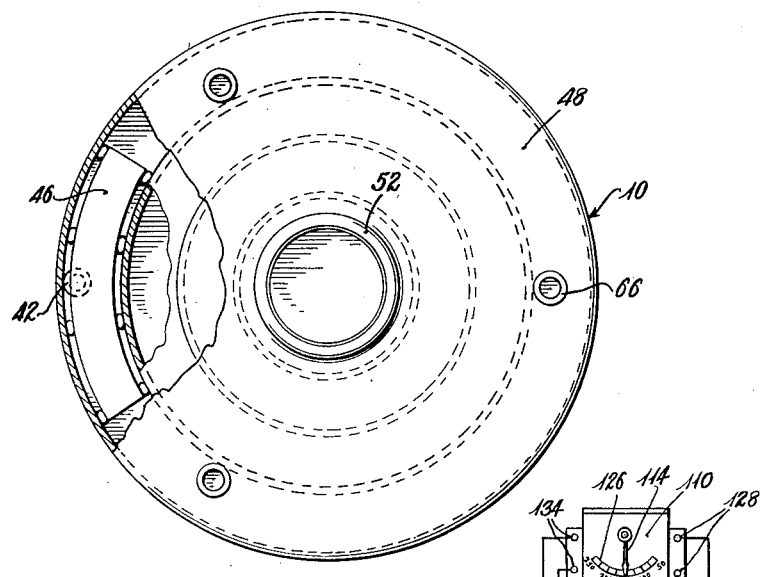
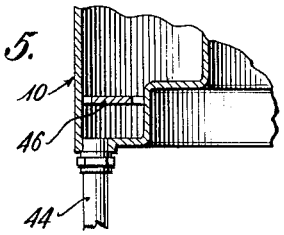
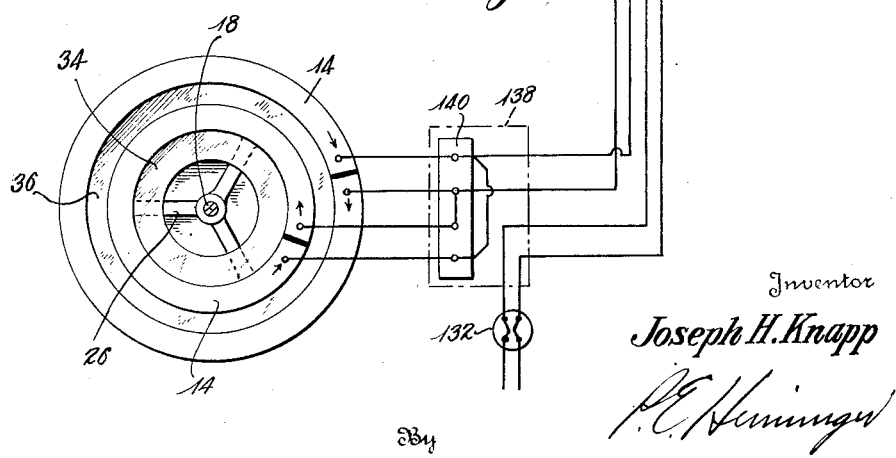
Inventor
Joseph H. Knapp
By
Attorney Patented Mar. 28, 1939

2,151,854

UNITED STATES PATENT OFFICE 2,151,854

LIQUID HEATER AND VAPORIZER

Joseph Henry Knapp, Utica, N. Y., assignor, by direct and mesne assignments, of nine and eight-tenths per cent to Helen Elizabeth Redmond, fourteen and seven-tenths per cent to John F. Grimmer, and twenty-four and one-half per cent to Thomas C. Redmond, all of Utica, N. Y.

Application December 30, 1937, Serial No. 182,568

13 Claims. (Cl. 219—39)

This invention relates to liquid heaters and vaporizers and more particularly to liquid heaters and vaporizers operated from heat generated from electric power.

The meritorious features of an electrical liquid heating system have long been recognized but little has been definitely accomplished in the field due to the failure to develop such heating systems which will operate within sufficiently economical range to permit successful competition with similar systems operating with either coal or oil as the heat generating medium. Heretofore all such electrically operated systems have involved the generous application of heating elements to large areas of tanks and the like containing relatively large quantities of water on the one hand, and on the other hand electrical heating units which have been submerged in the body of the liquid to be heated or vaporized. The devices which depend for their operation on the application of a heating element to the containers of relatively large bodies of water have been of such design as to be entirely inefficient in operation due to heat losses. Submerged heating units have been objectionable because of the necessity for frequent replacement of the unit due to corrosion resulting from mineral deposits on the electrical element and other causes. Furthermore, electrolysis of the fluid being heated or vaporized has often been a bad result of such submerged heating units.

The present invention involves an electrical heating system which is remarkable for its high efficiency and which overcomes defects of the prior device belonging to this same general class. To this end the invention contemplates the application of electrically generated heat to a small isolated portion of a relatively small body of liquid to be heated. It is an object of the invention to heat the isolated body of liquid through the use of electrical heating elements which are applied directly to the exterior of the liquid container so that heat energy is conveyed directly through the walls of the containers to the liquid to be heated. Furthermore, it is an object of the invention to design the heating unit assembly in a manner to utilize all of the heat energy generated without the dissipation of any substantial amount of energy.

It is a further object of the present invention to provide a heater of the type defined which is automatic in its operation and which involves safety features which make the same completely reliable in operation.

It is a further object of the invention to provide heaters of the class described which are constructed in such manner as to make them acceptable equipment for kitchens or other frequently used rooms of dwellings.

Other objects and advantages of the invention will become apparent as the more particular description of the invention proceeds taken in connection with the drawings which form a part of this application, and in which drawings:

Fig. 1 is a vertical sectional view of the heater according to one embodiment of the invention;

Fig. 2 is a vertical sectional view of a second embodiment of the invention;

Fig. 3 is a plan view corresponding to Fig. 2 and having portions thereof broken away to show underlying structure.

Fig. 4 is an example of the wiring that may be used to connect the heating elements and a control unit;

Fig. 5 is a fragment corresponding in part to Fig. 2;

Fig. 6 is a fragment corresponding in part to Fig. 1;

Fig. 7 is a modified form of the heater casing; and

Fig. 8 is a diagrammatic view showing the liquid circulator system.

With more particular reference to the drawings in which like reference numerals indicate like parts throughout the several figures, 10 indicates a liquid heating or vaporizing unit which will be referred to hereinafter as a generator. This unit comprises a stamping or casting of bronze or other suitable non-corrosive metal. The casting 10 has formed in the bottom thereof a stepped depression 12 adapted to receive a plurality of heating elements 14. The heating elements 14 are of well known commercial construction and need not be particularly described further than to say that they comprise generally a series of resistance wires embedded in pressed mica or similar material and that suitable connections are provided for electrical conductors. Located centrally within the stepped portion 12 of the generator 10 is a boss 16 which is screw-threaded to receive a bolt 18 upon which is secured holding plates 20 and 22. The holding plate 20 is in the form of a spider comprising the annulus 24 and the arms 26. The plate 22 comprises an annulus 28 and a closing plate 30 having an aperture 32 therein for receiving electrical conductors. Each plate 20 and 22 is centrally apertured to permit passage of the bolt 18.

The upper surface of the plates 20 and 22 is preferably highly polished to afford a heat reflecting surface. To further insure the utilization of all of the available heat radiating and reflecting rings 34 and 36 are provided. These rings extend inwardly beyond the heating elements 14 and have a highly polished surface disposed toward the generator 10. The rings 34 and 36 are located with their upper surfaces in contact with the lower surface of the heating elements 14. As a consequence of this arrangement any heat emanating from the lower surface of the heating elements 14 will be taken off by the rings 34 and 36 and will be reflected or radiated toward the generator casing. In order to avoid the loss of heat by radiation through the holding plate 22, an insulating member 38 is interposed between this holding plate 22 and the ring 36.

It is evident that the elements thus far described may be quickly assembled in the manner shown in the drawings by means of the bolt 18 and the nuts 40. The heating elements 14 are shown in the drawings as being spaced from the walls 12 of the generator unit but in actual practice the nuts 40 will be run up on the bolt 18 sufficiently to bring the face of each heating element into contact of the generator wall so that the heat being generated in these elements will be conveyed to the liquid within the generator on a path directly through the walls of the generator.

The generator 10 is provided with a cold water inlet 42 which may receive a conduit 44 connected through suitable valves, and if necessary, pressure reducers to a cold water main. Immediately above the inlet 42 is a vortex or diffusing plate 46 (better illustrated in Fig. 3), which serves to spread and diffuse the cool water supply and thus avoid sudden shock to heated parts. The top 48 of the generator 10 is provided with a plurality of apertures 50 and a centrally located internally screw-threaded hot water outlet 52.

Adapted to be used conjointly with the generator 10 is a storage or circulating tank 54 which consists of a side wall 56, a head 58 and a bottom 60. This bottom 60 is provided with a centrally located aperture 62 adapted to be secured to the generator outlet boss 52. There are also a plurality of apertures 64 corresponding in spacing to the apertures 50 of the generator head 48. Each of the apertures 50 and 64 are interconnected with a cool water return pipe 66 which extends to a point near the bottom of the generator 10 at its outer limits. A hot water circulating pipe or chimney 68 is screw-threaded into the throat of the hot water outlet 52 and extends a substantial distance toward the head 58 of the tank 54.

A suitable hot water outlet 70 is provided for the tank 54. Likewise other suitable outlets to accommodate, for example, pressure valves or safety devices, may be provided.

The generator 10 has a small capacity compared to the total capacity of the tank 54. The exact relation between the two is of no vital importance so long as the capacity of the generator 10 is sufficiently small to enable the temperature of the liquid therein to be raised quickly.

In order to obtain the highest degree of efficiency the generator 10 and the tank 54 are enclosed in a thermally insulated casing 72. This casing comprises a side wall 74, a head 76 and a base 78 made up of spaced annular sections 80 and 82. It is clear therefore that the insulating space 84 is defined by the side wall 74 on the outside and by parts of the heater structure on the inside. This space may be suitably insulated such as by evacuation or by a packing of glass wool or other insulating material for example.

The bottom of the casing is closed, for example in Fig. 1, by means of a cover plate 88 affixed to the annular base member 82 by means of screws 90 and a larger cover plate 92 which is affixed to the base annulus 80 by means of screws 94. If necessary a gasket may be employed between the cover plates 88 and 92 and the base members 82 and 80 respectively, for the purpose of securing an air-tight joint.

If the insulating space 84 is to be evacuated several methods may be employed. For example, a motor driven vacuum pump 96 may be employed. This pump may be mounted in any suitable manner such as from the legs of the heater (not shown), or from the outer cover plate 92 as illustrated in Fig. 1 of the drawings. Here the mounting is shown as comprising several metal strips 98 affixed and depending from the outer face of the cover plate 92. Such strips may be adapted to hold the pump support 100 which is preferably mounted thereon by means of spring 102 or other resilient means. The pump connection is through a suitable aperture 104 in the covering plate 92. With this particular mounting it will be seen at once that the vacuum pump assembly may be removed as a unit without disturbing any of its connections simply by removing the cover plate 92. Inasmuch as the opening in the annular base member 80 is larger than the opening in the annular base member 82, the inner cover plate 88 can be removed without difficulty upon the removal of the outer cover plate 92. Free access is obtained through this means to the heating unit assembly in the generator 10 although after the device has been installed and placed in operation it is contemplated that access to these heating elements will be seldom necessary.

A skirt 106 encloses the lower portion of the heater. This skirt is preferably formed of several units which may be joined by lugs 108 and one unit is preferably freely removable to give ready access to the space enclosed thereby.

In order to control the temperature of the water in the tank 54 and to maintain a constant supply of water at a desired temperature a control unit 110 is employed. The control unit 110 may be located at any desirable point such as, for example, within the space beneath the heater, or it may be located as shown in Fig. 1 of the drawings where it extends through the walls 56 and 74. This control unit is obtainable on the market and is of well known construction. No detailed description thereof need be given other than to say that it comprises a well 112 which is fixed in tight engagement with the walls 56 and 74, and a thermostat unit containing an expansive liquid and flexible bellows operable upon a snap action switch mechanism for making and breaking an electrical circuit. The range at which the thermostat 110 operates may be controlled by means of a manually adjustable pointer 114. The conductors 116 pass through a suitable conduit 118 between the thermostat switch member and the heating units 14. The conductors 116 pass through the annular base members 80 and 82 by way of a packed passage 120.

The casing 72 is provided with a flat top 122 which has an inwardly extending flange 124 adapted to rest on the upper edge of the wall member 74. The selection of materials for the various parts hereinabove described is well within the skill of a heating engineer but for the sake of a complete description it may be suggested that the tank 54 be constructed of a non-corrosive metal such as copper or a suitable alloy of which a number are available. The casing 72 may be constructed of rolled steel of which the exterior may be suitably finished to provide a pleasant appearance. The exterior of the tank walls and the skirt 86 are preferably painted black or coated with some material to inhibit radiation while the interior of the outer casing 72 preferably has a heat reflecting surface. The flat top 122 may be of stainless steel or Monel metal so that the same may be used as a table or other working surface.

In the description hereinabove the control for the electric power has been generally referred to. In Fig. 4 of the drawings a specific wiring diagram has been illustrated to adapt the heater to 110–125 volts. This drawing is exemplary only and it is understood that it will be suitably modified to accommodate higher voltage if necessary.

In Fig. 4 of the drawings 110 indicates the thermostat control element which has on the face thereof a graduated scale 126 and is provided with binding posts 128 to which conductors 130 are connected. The conductors 130 are connected to a source of electrical power through a snap switch 132. The other side of the switch mechanism of the thermostat 110 is provided with binding posts 134 which receive conductors 136 leading to a journal box 138 housing therein a bus bar 140. From the terminal block 140 the current is suitably distributed to the heating elements 14.

If, for example, the thermostat 110 is set at 150° and the water within the tank 54 drops below that temperature, the switch mechanism of the thermostat will close to permit current to flow to the heating elements 14. As soon as the liquid in the tank 54 rises to a point beyond 150° the connection between conductors 130 and 136 will be broken and the heating elements will cease to function until the temperature again drops low enough to bring the thermostat into operation once more. It has been the experience with submerged heating units that the same are frequently burnt out because of an unexpected drop in the level of the liquid below the point of submergence. In such cases the latent heat of the heating elements soon becomes destructive. In the present construction the heating elements 14 are in contact with metallic portions of the generator 10 which serve to conduct the heat away from the elements as rapidly as it is generated. Should, therefore, the liquid in the heater drop, the hot air and vapors reaching the thermostat 110 will cause the same to operate and cut out the heating elements before any damage can be done to them.

In Fig. 7 of the drawings is shown a modified form of insulating casing comprising inner wall 56 and outer wall 74 attached to a base channel 142 and having the tops thereof closed by cover members 58 and 76 respectively. This form of the casing includes a simplified bottom closure which is made up of an inner wall 146, and outer wall 144, and a connecting side wall 148. Suitable passages 120 are provided for pipes and electrical conduits. The space within the walls of the closure member is filled with heat insulating material 150. This material may be of any suitable character such as glass wool, asbestos flour or the like. The side walls 148 of the closure member are in tight contact with the inner face of the inner side wall 56 of the casing. This construction results in a casing having a space 84 between the walls thereof permanently sealed from the atmosphere. As a result of this construction, the space between the walls 56 and 74 can be suitably insulated either by placing therein an insulating material or by exhausting the atmosphere therefrom. It is contemplated that a suitable vacuum can be maintained in the space 84 by the use of a small hand operated vacuum pump such as shown at 152 in Fig. 6. If desired, a manually operable pump of this character may also be used in connection with the insulating casing shown in Fig. 1 and thereby eliminating the vacuum pump mechanism 96. The insulating casings may be reenforced by means of spacing members extending across the space defined by the walls 56 and 74. These reenforcing elements may be in the form of uprights or bolsters extending from the bottom to the top of the casing and lying at spaced points between the walls 56 and 74. All of these suggestions are merely illustrative since modifications become apparent after the broad principles have been taught.

Successful results can be obtained by using the generator 10 in connection with domestic hot water tanks now in use. A device such as that shown in Fig. 2 of the drawings may be constructed for such use. The capacity of hot water tanks now in general use far exceeds the capacity of the generator 10 and the principle of applying electrically generated heat by direct contact with the heating vessel which isolates a small portion of the total volume of water to be heated is still carried out. The generator of Fig. 2 of the drawings is in most respects the same as that shown in Fig. 1, the only difference being in the heating element assembly which optionally may be employed. The heating element assembly in Fig. 2 is simplified by the omission of the reflecting plate 34 overlying the spider 24. Furthermore it will be noted that the closure plate 22 is plain in cross-section whereas the plate 22 of Fig. 1 is dished to suggest a manner in which additional strength can be imparted thereto to avoid warping under the influence of heat.

The operation of the invention has been, for the most part, described as the specification proceeded but to emphasize the operation of the heater, the flow of liquids therein has been diagrammatically illustrated in Fig. 8 of the drawings. In connection with this figure, it will be noted that cold water is tapped from the main and enters the generator 10 through conduit 44. As this water comes in contact with the heated stepped portions 12 of the generator the temperature thereof is rapidly raised and as the current of hot water from the tank 10 rises through outlet 68, cool portions of water are displaced through the pipes 66 and this water is heated and rises through the tube 68 in a manner similar to that which has gone before. Thus a constant circulation is maintained while the heating elements are in operation and as hot water is drawn from the top of the tank 72 a fresh supply enters through the pipe 44, the pressure throughout the entire system including the supply mains being equal and substantially constant.

Thus it will be seen that the stated objects of the invention and many others are obtained through a construction described and that the invention is operable upon the principles that a small body of liquid can be effectively heated by electrical heating means and that by properly circulating such highly heated small portions of liquid, the entire body of liquid can be brought to the desired temperature and can be maintained there within relatively close limits.

The invention has now been described in a specific operable form but many modifications may be made in this form without departing from the broad principles of the invention as taught herein, and it is therefore desired that the practice thereof be not limited other than by such limitations as may be imposed thereon by the terms of the subjoined claims.

What I claim is:

1. A liquid heater and vaporizer adapted for use with a hot liquid storage tank comprising a liquid chamber having cool liquid inlets and a hot liquid outlet in the top thereof adapted to be brought into communication with a storage tank, a recess in the bottom of said chamber, a plurality of electric heating units in said recess and in contact with the wall thereof, a plate substantially closing the mouth of said recess, and a cold liquid inlet at the bottom of said chamber adapted to discharge cold liquid against the walls of said recess.

2. A liquid heater and vaporizer adapted for use with a hot liquid storage tank comprising a liquid chamber having cool liquid inlets and a hot liquid outlet in the top thereof adapted to be brought into communication with a storage tank, a stepped recess in the bottom of said chamber, a plurality of heating units in said recess and in contact with the wall thereof, a plate substantially closing the mouth of said recess, and a cold liquid inlet at the bottom of said chamber adapted to discharge cold liquid against the walls of said recess.

3. A liquid heater and vaporizer adapted for use with a hot liquid storage tank comprising a liquid chamber having cool liquid inlets and a hot liquid outlet in the top thereof adapted to be brought into communication with a storage tank, a recess in the bottom of said chamber, an electrical heating unit in said recess and in contact with a wall thereof, the plate substantially closing the mouth of said recess, the inner face of said plate being highly polished to provide a heat reflecting surface, and a cold liquid inlet at the bottom of said chamber adapted to discharge cold liquid against the walls of said recess.

4. A liquid heater and vaporizer adapted for use with a hot liquid storage tank comprising a liquid chamber having cool liquid inlets and a hot liquid outlet in the top thereof adapted to be brought into communication with a storage tank, a stepped recess in the bottom of said chamber, an electric heating unit within said recess and in contact with the wall thereof, means for maintaining said unit in position, a second electric heating unit within said recess, a plate substantially closing the mouth of said recess and adapted to hold said second heating unit in position, and a cold liquid inlet at the bottom of said chamber adapted to discharge cold liquid against the walls of said recess.

5. A liquid heater and vaporizer adapted for use with a hot liquid storage tank comprising a liquid chamber having cool liquid inlets and a hot liquid outlet in the top thereof adapted to be brought into communication with a storage tank, a recess in the bottom of said chamber, an electric heating unit in said recess, a heat reflecting plate closing the mouth of said recess, heat insulating material between said heating unit and said heat reflecting plate, and a cold liquid inlet at the bottom of said chamber adapted to discharge cold liquid against the walls of said recess.

6. A liquid heater and vaporizer adapted for use with a hot liquid storage tank comprising a liquid chamber having cool liquid inlets and a hot liquid outlet in the top thereof adapted to be brought into communication with a storage tank, a recess in the bottom of said chamber, a plurality of electric heating units within said recess, a heat reflecting member behind each heating unit adapted to reflect heat toward a wall of said chamber, and a cold liquid inlet at the bottom of said chamber adapted to discharge cold liquid against the walls of said recess.

7. A liquid heater comprising a hot liquid storage receptacle and a liquid heating receptacle, a heating unit in contact with a wall of said liquid heating receptacle, a cold liquid supply inlet at the bottom of said heating receptacle adapted to discharge liquid against the receptacle wall heated by said heating unit, a hot liquid outlet in said storage receptacle, a centrally located passage between said heating receptacle and storage receptacle permitting the passage of hot liquid from said heating receptacle to said storage receptacle, and passages between said receptacles remote from said central passage for permitting circulation of the cool liquid from said storage receptacle to said heating receptacle, whereby such re-circulated cool liquid is mixed with incoming cold liquid.

8. A liquid heater and vaporizer comprising a storage receptacle and a heating receptacle, a heating unit in the bottom of said heating receptacle, a cold liquid supply inlet for said heating receptacle in the bottom thereof adapted to discharge cold liquid against the heated area thereof, a hot liquid outlet in said storage receptacle, a centrally located connection between said receptacles permitting the passage of hot liquid from said heating receptacle to said storage receptacle, and a plurality of connections between said receptacles and remote from said central connection for permitting passage of cool liquid from said storage receptacle to said heating receptacle, whereby the same is mixed with incoming cold liquid.

9. A liquid heater and vaporizer comprising a storage receptacle and a heating receptacle, a heating unit in the bottom of said heating receptacle, a cold liquid supply inlet for said heating receptacle at the bottom thereof adapted to discharge cold liquid against the heated area thereof, a hot liquid outlet in said storage receptacle, a centrally located connection between said receptacles permitting the passage of hot liquid from said heating receptacle to said storage receptacle, and a plurality of connections between receptacles and remote from said central connection for permitting passage of cool liquid from said storage receptacle to said heating receptacle whereby the same is mixed with incoming cold liquid, said centrally located connection including a conduit extending toward the top of said storage receptacle.

10. A liquid heater comprising a hot liquid storage receptacle and a liquid heating receptacle, a heating unit in contact with a wall of said liquid heating receptacle, a cold liquid supply inlet at the bottom of said heating receptacle adapted to discharge liquid against the receptacle wall heated by said heating unit, a hot liquid outlet in said storage receptacle, a centrally located passage between said receptacles permitting the passage of hot liquid from said heating receptacle to said storage receptacle, passages between said receptacles remote from said central passage for permitting circulation of cool liquid from said storage receptacle to said heating receptacle whereby such recirculated cool liquid is mixed with incoming cold liquid, and an insulating casing completely enclosing both of said sections.

11. A liquid heater comprising a hot liquid storage receptacle and a substantially smaller liquid heating receptacle, an electric heating unit in contact with the exterior of said liquid heating unit at the bottom thereof, a cold liquid supply inlet at the bottom of said receptacle adapted to discharge liquid against the receptacle wall heated by said heating unit, a hot liquid outlet in said storage receptacle, a centrally located passage between said receptacles permitting the passage of hot liquid from said heating receptacle to said storage receptacle, passages between said receptacles remote from said central passage for permitting circulation of cool liquid from said storage receptacle to said heating receptacle whereby such re-circulated cool liquid is mixed with incoming cold liquid, and an insulating casing completely enclosing both of said sections.

12. A liquid heater comprising a hot liquid storage receptacle and a liquid heating receptacle, a heating unit in contact with the exterior of said liquid heating receptacle and at the bottom thereof, a cold liquid supply inlet at the bottom of said heating receptacle adapted to discharge liquid against the receptacle wall heated by said heating unit, a hot liquid outlet in said storage receptacle, a centrally located passage between said receptacles permitting the passage of hot liquid from said heating receptacle to said storage receptacle, passages between said receptacles for permitting circulation of cool liquid from said storage receptacle to said heating receptacle whereby such re-circulated cool liquid is mixed with incoming cold liquid, and a vacuum casing completely enclosing both of said sections.

13. A liquid heater comprising a hot liquid storage receptacle and a liquid heating receptacle, an upwardly stepped recess in the bottom of said liquid heating receptacle, a plurality of electric heating elements in said recess and in contact with the walls thereof, a closure plate in the mouth of said recess, a cold liquid supply inlet at the bottom of said heating receptacle adapted to discharge liquid against the walls of said stepped recess, a hot liquid outlet in said storage receptacle, a passage between said receptacle permitting the passage of hot liquid from said heating recess to said storage receptacle, and other passages between said receptacles for permitting circulation of cool liquid from said storage receptacle to said heating receptacle whereby such re-circulated cool liquid is mixed with incoming cold liquid.

JOSEPH HENRY KNAPP.